(12) United States Patent
Ong

(10) Patent No.: US 6,922,786 B1
(45) Date of Patent: Jul. 26, 2005

(54) REAL-TIME MEDIA COMMUNICATIONS OVER FIREWALLS USING A CONTROL PROTOCOL

(75) Inventor: Lyndon Ong, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 973 days.

(21) Appl. No.: 09/704,187

(22) Filed: Oct. 31, 2000

(51) Int. Cl.[7] .......................... H04L 12/26; G06F 11/30
(52) U.S. Cl. ..................... 713/201; 713/200; 709/227; 709/204; 704/270
(58) Field of Search .................... 713/201, 200; 709/227, 204, 206, 229; 704/270, 231, 246, 251; 370/238, 392; 712/300

(56) References Cited

U.S. PATENT DOCUMENTS

| 5,835,726 | A | * | 11/1998 | Shwed et al. ............... 709/229 |
| 6,304,975 | B1 | * | 10/2001 | Shipley ....................... 713/201 |
| 6,321,336 | B1 | * | 11/2001 | Applegate et al. .......... 713/201 |
| 6,456,594 | B1 | * | 9/2002 | Kaplan et al. ............... 370/238 |
| 6,496,935 | B1 | * | 12/2002 | Fink et al. ................... 713/201 |
| 6,557,037 | B1 | * | 4/2003 | Provino ....................... 709/227 |
| 6,580,717 | B1 | * | 6/2003 | Higuchi et al. .............. 370/401 |
| 6,598,075 | B1 | * | 7/2003 | Ogdon et al. ................ 709/204 |
| 6,606,596 | B1 | * | 8/2003 | Zirngibl et al. ............. 704/270 |
| 6,611,863 | B1 | * | 8/2003 | Banginwar ................... 709/220 |
| 6,631,466 | B1 | * | 10/2003 | Chopra et al. .............. 712/300 |
| 6,690,669 | B1 | * | 2/2004 | Tsuchiya et al. ............ 370/392 |
| 6,701,366 | B1 | * | 3/2004 | Kallas et al. ................ 709/227 |

* cited by examiner

Primary Examiner—Ly V. Hua
(74) Attorney, Agent, or Firm—Blakely Sokoloff Taylor & Zafman

(57) ABSTRACT

In one embodiment of the invention, a real-time firewall processor includes a controller and a filter. The controller specifies a filtering characteristic based on a control protocol from a call server serving a firewall between a source and a destination networks. The filter is coupled to the controller to filter a packet in a call transmitted from the source network based on the filtering characteristic, the filter accepting the packet if the packet satisfies the filtering characteristic and rejecting the packet otherwise.

52 Claims, 3 Drawing Sheets

REAL-TIME MEDIA COMMUNICATIONS OVER FIREWALLS USING A CONTROL PROTOCOL

BACKGROUND

1. Field of the Invention

This invention relates to network communication. In particular, the invention relates to firewalls.

2. Description of Related Art

Currently, firewalls do not admit traffic which is not recognized. Most voice over Internet protocol (VoIP) traffic is not allowed across a firewall boundary because VoIP traffic contains no indication that the packet is VoIP and no indication of the originating and destination parties in the call. This limits VoIP service to service within a firewall-protected domain and does not allow users within the domain to call outside the domain and vice versa One existing technique is to add intelligence to firewall protocol so that the firewall can understand call signaling protocol (e.g., H.323) and can determine what Internet protocol (IP) address pair and UDP port pair to admit for a particular call. This technique has a number of drawbacks. First, the firewall is required to have significantly greater processing power and demands, resulting in high costs and integration efforts. Second, the firewall is required to be updated frequently as call signaling protocols change or are introduced, resulting in high maintenance and downtime costs. Third, the signaling is required to be processed by the firewall on every call, adding set-up delays and slowing down traffic.

Therefore, there is a need in the technology to provide an efficient technique for media communication via firewalls.

SUMMARY

The present invention is a method and apparatus to provide real-time media communication via firewalls. A real-time firewall includes a controller, a filter, and a modifier. The controller specifies a filtering characteristic based on a control protocol from a call server serving a firewall between source and a destination networks. The filter filters a packet in a call transmitted from the source network based on the filtering characteristic. The filter accepts the packet if the packet satisfies the filtering characteristic and rejects the packet otherwise.

According to one embodiment of the present invention, the controller further specifies a modifying action based on the control protocol. The real-time firewall further includes a modifier coupled to the controller and the filter to modify the accepted packet based on the modifying action. The modified packet is then sent to the destination network. The filtering characteristic may be at least one of a traffic characteristic, a network address, and a port identifier corresponding to the call.

The firewall in this invention may be able to do at least one of the following: (1) providing extensibility to existing firewall set-up, (2) allowing users within a firewall to call users outside firewall and vice versa, (3) increasing effective traffic management over firewall boundaries, and (4) accommodating real-time media communication over firewalls at low costs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features of the present invention will become apparent from the following detailed description of the present invention in which.

DESCRIPTION

A method and apparatus provides a technique for media communication across a firewall boundary in a network environment. In one embodiment of the invention, a real-time firewall includes a controller, a filter, and a modifier. The controller specifies a filtering characteristic based on a control protocol from a call server serving a firewall between a source and a destination networks. The filter filters a packet in a ball transmitted from the source network based on the filtering characteristic. The filter accepts the packet if the packet satisfies the filtering characteristic and rejects the packet otherwise.

The firewall in this invention may be able to do at least one of the following: (1) providing extensibility to existing firewall set-up, (2) allowing users within a firewall to call users outside firewall and vice versa, (3) increasing effective traffic management over firewall boundaries, and (4) accommodating real-time media communication over firewalls at low costs.

In the following description, for purposes of explanation, numerous details are set forth in order to provide a thorough understanding of the present invention. However, it will be apparent to one skilled in the art that these specific details are not required in order to practice the present invention. In other instances, wellknown electrical structures and circuits are shown in block diagram form in order not to obscure the present invention. For example, specific details are not provided as to whether the method is implemented in a station as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

Figure 1:
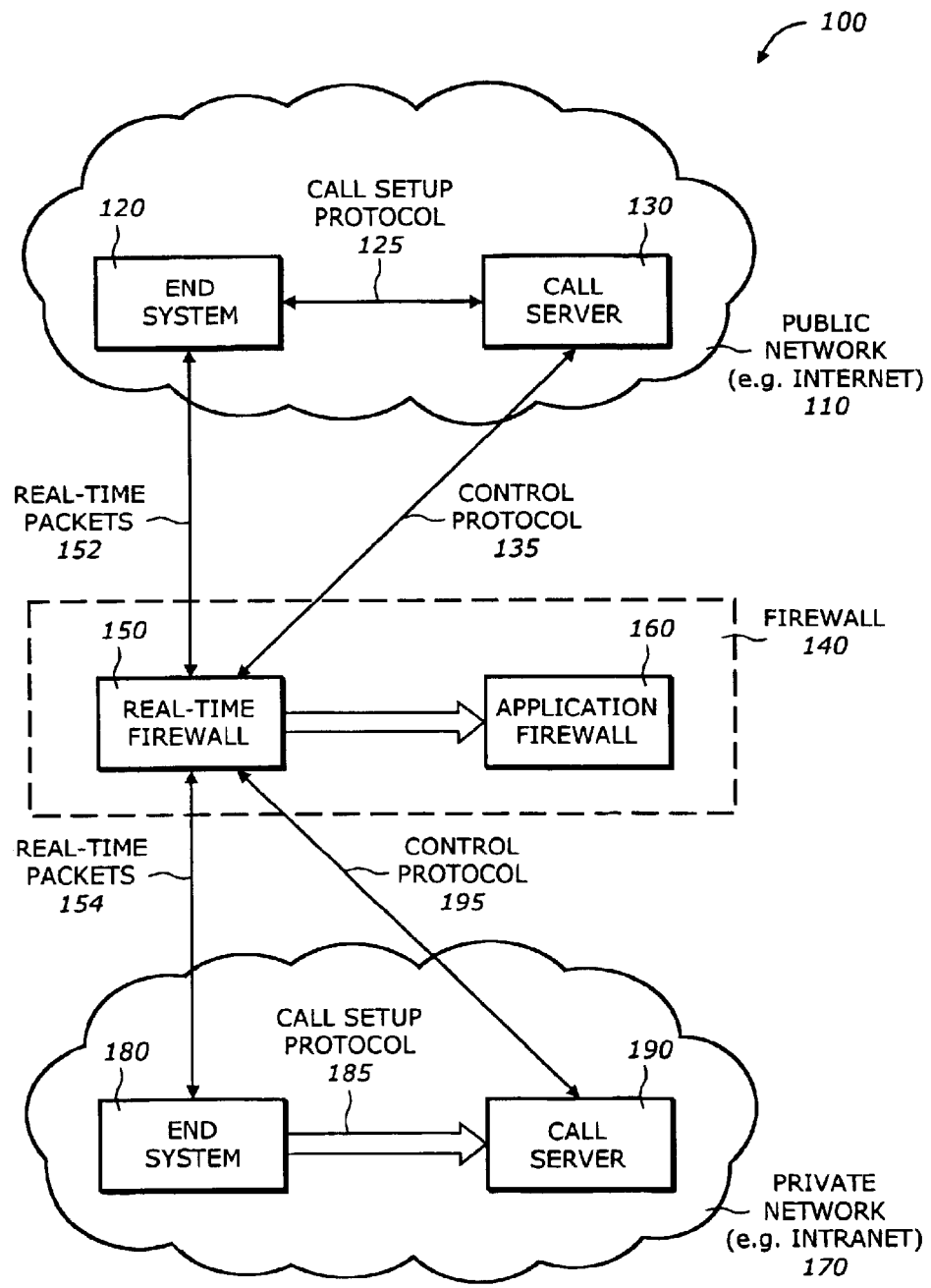
FIG. 1 is a diagram illustrating a system in which at least one embodiment of the invention can be practiced.

FIG. 1 is a diagram illustrating a system 100 in which one embodiment of the invention can be practiced. The system 100 includes a public network 110, a private network 170, and a firewall 140.

The public network 110 is a public network external to the organization, e.g., the Internet. The public network 110 includes an end system 120 and a call server 130. The end system 120 is a system that receives or transmits a call or a message. Examples of the end system 120 include a computer, a call processing unit, a workstation, a private branch exchange (PBX), a telephony device, a wireless call unit. The end system 120 sends or receives real-time packets 152 to or from the firewall 140. In one embodiment, the real-time packets 152 may include real-time media information such as Voice over IP (VoIP), video, or audio/video. The call server 130 is a computer system that contains database, storage, processing power, switch and connection interfaces to other elements in the network 110. The call server 130 communicates with the end system 120 for a call setup, either during receiving and transmitting, using a call setup protocol 125. In addition, the call server 130 communicates with the firewall 140 using a control protocol 135.

The private network 170 is a network internal to the organization, e.g., an intranet. The private network 170 includes an end system 180 and a call server 190. The end system 180 is a system that receives or transmits a call or a message. Examples of the end system 180 include a computer, a processor, a central processing unit, a digital signal processing system, a call processing unit, a workstation, a private branch exchange (PBX), a telephony device, a wireless call unit, etc. The end system 180 sends or receives real-time packets 154 to or from the firewall 140. In one embodiment, the real-time packets 154 may include real-time media information such as Voice over IP (VoIP), video, or audio/video. The call server 190 is a computer system that contains database, storage, processing power, switch and connection interfaces to other elements in the network 170. The call server 190 communicates with the end system 180 for a call setup, either during receiving and transmitting, using a call setup protocol 185. In addition, the call server 190 communicates with the firewall 140 using a control protocol 195.

At any time, the public network 110 may be transmitting or receiving a call to or from the network 170 via the firewall 140. Similarly, the private network 170 maybe transmitting or receiving a call to or from the public network 110 via the firewall 140. A network that is transmitting information is a source network and a network that is receiving information is a destination network.

The firewall 140 is located between the networks 110 and 170. The firewall 140 includes a real-time firewall 150 and an application firewall 160. Each of the firewalls 150 and 160 can also perform network address translation (NAT). In one embodiment, packets go to the real-time firewall 150 first. The real-time firewall 150 receives real-time packets from the source network and forwards packets that are accepted according to some filtering characteristics described in the corresponding control protocol. Packets that are rejected are then forwarded to the application firewall 160 or discarded or dumped. The application firewall 160 can apply more complex analysis such as stateful inspection to determine if the packets should be allowed in or out.

Figure 2:
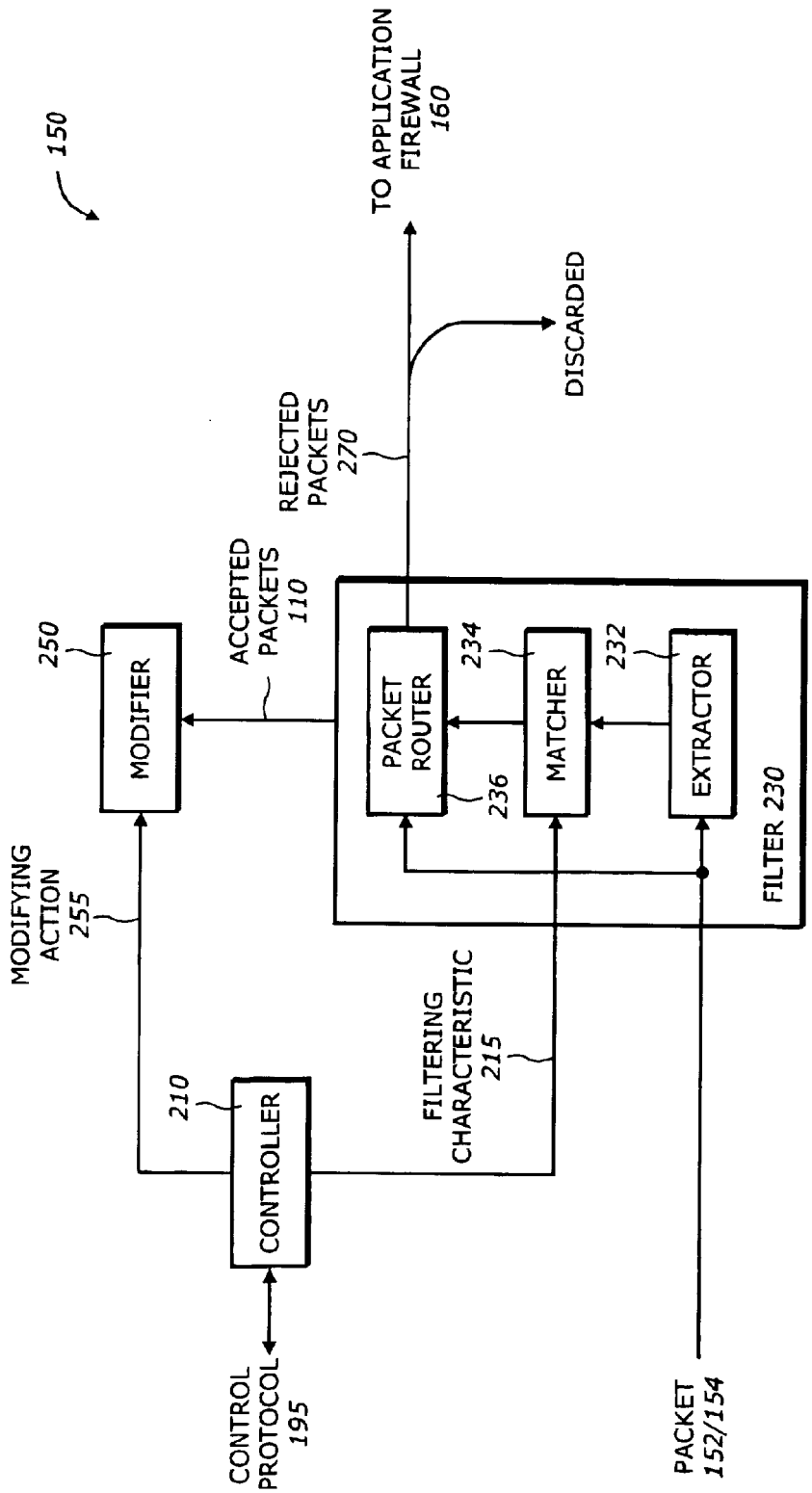
FIG. 2 is a diagram illustrating a real-time firewall according to one embodiment of the invention.

FIG. 2 is a diagram illustrating the real-time firewall 150 shown in FIG. 1 according to one embodiment of the invention. The real-time firewall 150 includes a controller 210, a filter 230, and a modifier 250. The controller 210, the filter 230, and the modifier 250 may be implemented by hardware, software, firmware or any combination thereof. Hardware, software, or firmware implementation may be represented by modules. Module coupling may include physical connections, common memory, message passing, parameter and/or argument passing, or any technique that allows information from one module to be transferred to another module.

The controller 210 specifies a filtering characteristic 215 based on the control protocol 135 or 195 from the call server 130 or 190. The call server 130 or 190 is shown in FIG. 1 and is used to serve the firewall 140 between the networks 110 and 170. At any time, one of the networks 110 and 170 is a source network and the other is a destination network. The controller 210 further specifies a modifying action 255 based on the control protocol 135 or 195.

The filtering characteristic 215 characterizes the packets to be received or transmitted from the end system 120 or 180 (FIG. 1). The filtering characteristic 215 may be any one of a traffic characteristic, a network address, a port identifier, any combination of source and destination addresses and port numbers, or packet fields such as the presence of an RTP header, corresponding to the call at the end system 120 or 180. The call may be a voice over Internet protocol (VoIP) call, a video message, or a video/audio message.

The filter 230 is coupled to the controller 210 to filter the packet 152 or 154 in a call transmitted from the source network based on the filtering characteristic 215. The filter 230 includes an extractor 232, a matcher 234, and a packet router 236. The extractor 232 extracts a characteristic of the packet 152 or 154. The matcher 234 compares the extracted characteristic and the filtering characteristic 215 and generates a matching result. The packet router 236 routes the packet 152/154 to the modifier 250 as an accepted packet 260 if the packet 152/154 satisfies the filtering characteristic 215 (e.g., the matcher 234 generates a matching result between the extracted characteristic and the filtering characteristic 215). The packet router 236 routes the packet 152/154 to the application firewall 160 or merely dumps the packet as a rejected packet 270 if the packet 152/154 does not satisfy the filtering characteristic 215 (e.g., the matcher 234 generates a non-matching result between the extracted characteristic and the filtering characteristic 215). The rejected packet 270 may be further processed by the application firewall 160 to determine if the packet can be further accepted or rejected by the firewall.

The modifier 250 is coupled to the controller 210 and the filter 230 to modify the accepted packet 260 based on the modifying action 255. Then the modified packet is sent to the destination network. The modifying action 255 may be one of an address swapping, a port swapping, a network address translation (NAT), and a protocol conversion. The protocol conversion may be a conversion from Internet Protocol version 4 (IPv4) to Internet Protocol version 6 (IPv6), or vice versa.

The control protocol 135/195 may be any appropriate protocol. Examples of the control protocol 135/195 include Media Gateway Control (Megaco) protocol and the Common Open Policy Service (COPS) protocol, especially the COPS for Policy Provisioning (COPS-PR).

The COPS is supported at many routers and by policy servers. The COPS messages are transported over a secure TCP connection. The COPS message sequence typically consists of a request (REQ) message and a decision (DEC) message. The REQ message is sent from the real-time fire wall 150 to the call server 130/190 to request filtering information. The DEC message is sent from the call server 130/190 to the real-time firewall 150 to contain-filtering information including the filtering characteristic 215. The objects carried in the COPS message may include Policy Rule Identifier (PRID) objects, Encoded Policy Instance Data (EPD) objects, and optional extensions. The PRID objects reference one or more specific filtering rules (e.g., traffic bandwidth, IP address or port number corresponding to the call). The EPD objects carry an encoded value comprising a policy or a filtering rule. The extensions may include information on network address translation (NAT) or protocol conversion (e.g., between IPv4 and IPv6).

Figure 3:
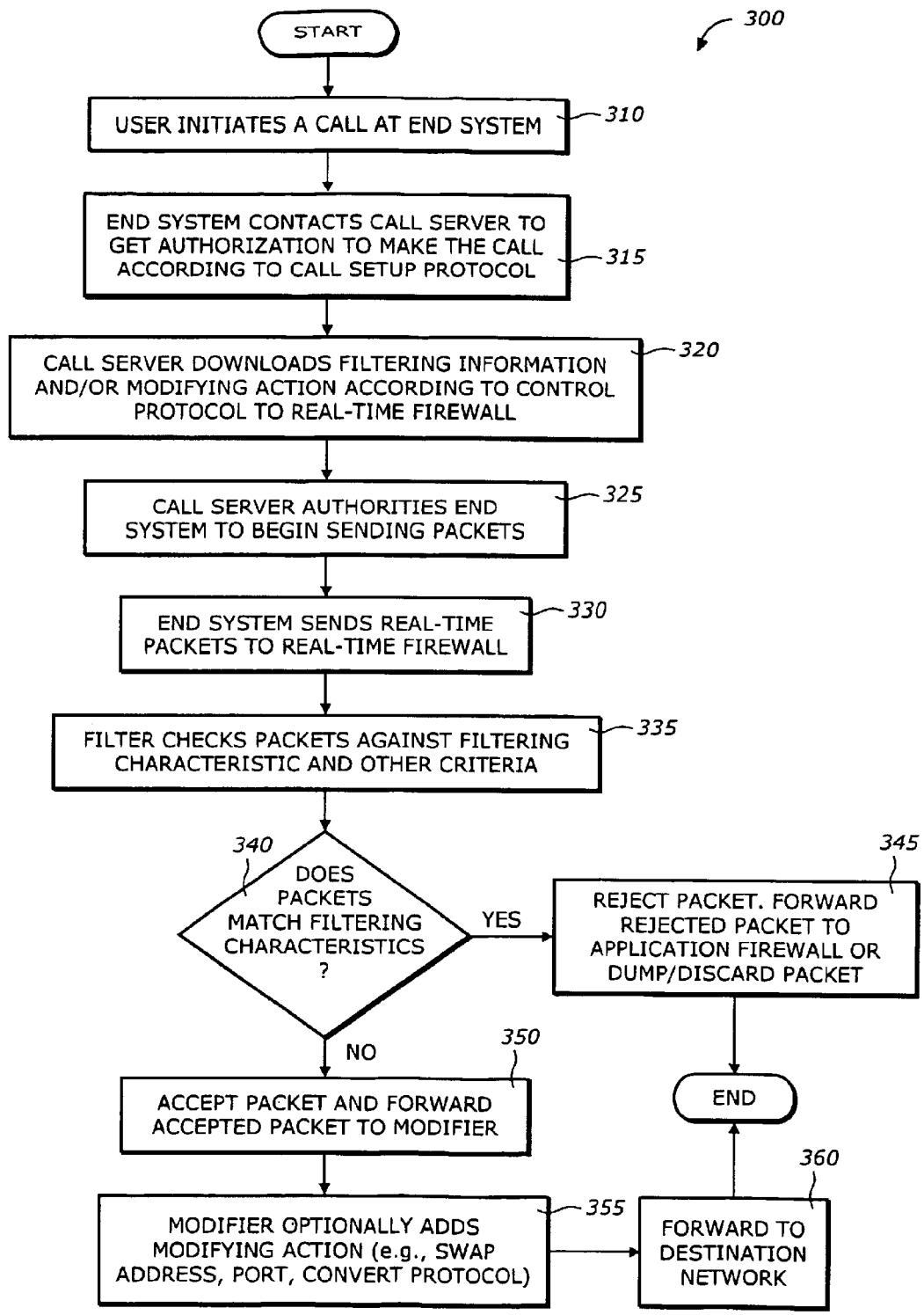
FIG. 3 is a flowchart illustrating a process for real-time media communication across firewall according to one embodiment of the invention.

FIG. 3 is a flowchart illustrating a process 300 for real-time media communication across firewall according to one embodiment of the invention. Note that the order of the processing blocks is merely for illustrative purposes. The order of operations may be changed as appropriate.

Upon START, the user initiates a call at the end system (Block 310). This call may include a VoIP, a video message, a video/audio message, or any media message or communication. Then, the end system contacts the corresponding call server to get authorization to make the call according to the call setup protocol (Block 315). Next, the call server downloads the filtering information, including a filtering characteristic, and/or modifying action to the real-time firewall using a control protocol (Block 320). The call server then authorizes the end system to begin sending real-time packets for the call (Block 325). Upon receipt of the authorization from the call server, the end system sends real-time packets to the real-time firewall (Block 330). Then, the filter in the real-time firewall checks the packets against the filtering characteristic and other criteria (Block 335).

Next, it is determined if the packet matches the filtering characteristic (Block 340). If not, the packet is rejected and is forwarded to the application firewall or is discarded (Block 345). The process 300 is then terminated. Otherwise, if the packet satisfies the filtering characteristic, it is accepted and is forwarded to the modifier (Block 350). Then, the modifier optionally adds a modifying action (e.g., swap addresses, swap port numbers, convert protocol) to the accepted packet (Block 355). The modifier then forwards the modified packet to the destination network (Block 360). The process 300 is then permitted.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a controller to specify a filtering characteristic based on a control protocol from a call server serving a firewall between a source network and a destination networks; and
   a filter coupled to the controller to filter a packet in a call transmitted from the source network based on the filtering characteristic, the filter accepting the packet if the packet satisfies the filtering characteristic and rejecting the packet otherwise.

2. The apparatus of claim 1 wherein the controller further specifies a modifying action based on the control protocol.

3. The apparatus of claim 2 further comprises: a modifier coupled to the controller and the filter to modify the accepted packet based on the modifying action, the modified packet being sent to the destination network.

4. The apparatus of claim 3 wherein the modifying action is one of an address swapping, a port swapping, and a protocol conversion.

5. The apparatus of claim 4 wherein the protocol conversion is a conversion between an IPv4 and an IPv6.

6. The apparatus of claim 3 wherein the filter comprises:
   an extractor to extract a packet characteristic from the packet;
   a matcher coupled to the extractor to match the packet characteristic with the filtering characteristic; and
   a packet router coupled to the matcher to route the packet to the modifier if the packet characteristic matches the filtering characteristic.

7. The apparatus of claim 1 wherein the source network is one of a public network, and a private network.

8. The apparatus of claim 1 wherein the destination network is one of a public network and a private network.

9. The apparatus of claim 1 wherein the filtering characteristic is one of a traffic characteristic, a network address, and a port identifier corresponding to the call.

10. The apparatus of claim 9 wherein the call is a voice over Internet protocol (VoIP) call.

11. The apparatus of claim 1 wherein the rejected packet is sent to an application firewall.

12. The apparatus of claim 1 wherein the control protocol is one of a megaco protocol and a Common Open Policy Service (COPS) protocol.

13. A method comprising:
    specifying a filtering characteristic based on a control protocol from a call server serving a firewall between a source network and a destination network;
    filtering a packet in a call transmitted from the source network based on the filtering characteristic; and
    accepting the packet if the packet satisfies the filtering characteristic, and rejecting the packet otherwise.

14. The method of claim 13 wherein specifying further comprises specifying a modifying action based on the control protocol.

15. The method of claim 14 further comprises:
    modifying the accepted packet based on the modifying action using a modifier, the modified packet being sent to the destination network.

16. The method of claim 15 wherein filtering comprises:
    extracting a packet characteristic from the packet;
    matching the packet characteristic with the filtering characteristic; and
    routing the packet to the modifier if the packet characteristic matches the filtering characteristic.

17. The method of 14 wherein the modifying action is one of an address swapping, a port swapping, and a protocol conversion.

18. The method of claim 17 wherein the protocol conversion is a conversion between an IPv4 and an IPv6.

19. The method of claim 13 wherein the source network is one of a public network and a private network.

20. The method of claim 13 wherein the destination network is one of a public network and a private network.

21. The method of claim 13 wherein the filtering characteristic is one of a traffic characteristic, a network address, and a port identifier corresponding to the call.

22. The method of claim 21 wherein the call is a voice over Internet protocol (VoIP) call.

23. The method of claim 13 wherein the rejected packet is sent to an application firewall.

24. The method of claim 13 wherein the control protocol is one of a megaco protocol and a Common Open Policy Service (COPS) protocol.

25. A computer program product comprising:
    a machine useable medium having computer program code embedded therein, the computer program product having:
    computer readable program code to specify a filtering characteristic based on a control protocol from a call server serving a firewall between a source network and a destination network; and computer readable program code to filter a packet in a call transmitted from the source network based on the filtering characteristic; and computer readable program code to accept the packet if the packet satisfies the filtering characteristic and rejecting the packet otherwise.

26. The computer program product of claim 25 wherein the computer readable program code to specify further comprises specifying a modifying action based on the control protocol.

27. The computer program product of claim 26 further comprises:

computer readable program code to modify the accepted packet based on the modifying action using a modifier, the modified packet being sent to the destination network.

28. The computer program product of claim 27 wherein the computer readable program code to filter comprises:

computer readable program code to extract a packet characteristic from the packet;

computer readable program code to match the packet characteristic with the filtering characteristic; and computer readable program code to route the packet to the modifier if the packet characteristic matches the filtering characteristic.

29. The computer program product of 26 wherein the modifying action is one of an address swapping, a port swapping, and a protocol conversion.

30. The computer program product of claim 29 wherein the protocol conversion is a conversion between an IPv4 and an IPv6.

31. The computer program product of claim 25 wherein the source network is one of a public network and a private network.

32. The computer program product of claim 25 wherein the destination network is one of a public network and a private network.

33. The computer program product of claim 25 wherein the filtering characteristic is one of a traffic characteristic, a network address, and a port identifier corresponding to the call.

34. The computer program product of claim 33 wherein the call is a voice over Internet protocol (VoIP) call.

35. The computer program product of claim 25 wherein the rejected packet is sent to an application firewall.

36. The computer program product of claim 25 wherein the control protocol is one of a megaco protocol and a Common Open Policy Service (COPS) protocol.

37. A system comprising:

a source network and destination network;

an application firewall coupled to the source and destination networks; and a real-time firewall coupled to the source and destination networks to process real-time packets, the real-time fire-wall comprising:

a controller to specify a filtering characteristic based on a control protocol from a call server serving a firewall between the source and the destination networks, and a filter coupled to the controller to filter a packet in a call transmitted from the source network based on the filtering characteristic, the filter accepting the packet if the packet satisfies the filtering characteristic and rejecting the packet otherwise.

38. The system of claim 37 wherein the controller further specifies a modifying action based on the control protocol.

39. The system of claim 38 further comprises:

a modifier coupled to the controller and the filter to modify the accepted packet based on the modifying action, the modified packet being sent to the destination network.

40. The system of claim 39 wherein the modifying action is one of an address swapping, a port swapping, and a protocol conversion.

41. The system of claim 40 wherein the protocol conversion is a conversion between an IPv4 and an IPv6.

42. The system of claim 37 wherein the source network is one of a public network and a private network.

43. The system of claim 39 wherein the filter comprises:

an extractor to extract a packet characteristic from the packet;

a matcher coupled to the extractor to match the packet characteristic with the filtering characteristic; and a packet router coupled to the matcher to route the packet to the modifier if the packet characteristic matches the filtering characteristic.

44. The system of claim 37 wherein the destination network is one of a public network and a private network.

45. The system of claim 37 wherein the filtering characteristic is one of a traffic characteristic, a network address, and a port identifier corresponding to the call.

46. The system of claim 45 wherein the call is a voice over Internet protocol (VOIP) call.

47. The system of claim 37 wherein the rejected packet is sent to an application firewall.

48. The system of claim 37 wherein the control protocol is one of a megaco protocol and a Common Open Policy Service (COPS) protocol.

49. An apparatus comprising:

a controller to specify a filtering characteristic based on a control protocol from a call server serving a firewall between a source and a destination networks;

a filter coupled to the controller to filter a packet in a call transmitted from the source network based on the filtering characteristic, the filter accepting the packet if the packet satisfies the filtering characteristic and rejecting the packet otherwise; and a modifier coupled to the controller and the filter to modify the accepted packet based on a modifying action, the modified packet being sent to the destination network.

50. The apparatus of claim 49 wherein the controller further specifies the modifying action based on the control protocol.

51. The apparatus of claim 49 wherein the source network is one of a public network and a private network.

52. The apparatus of claim 49 wherein the destination network is one of a public network and a private network.

* * * * *